US006196573B1

United States Patent
Worrell et al.

(10) Patent No.: US 6,196,573 B1
(45) Date of Patent: Mar. 6, 2001

(54) MOUNTING MECHANISM FOR INFLATABLE RESTRAINT SYSTEM

(75) Inventors: Barry Christian Worrell, Centerville; Patrick W. Schatz, Lebanon; Ryan Todd Pinsenschaum, Vandalia, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/409,355

(22) Filed: Sep. 30, 1999

Related U.S. Application Data

(63) Continuation-in-part of application No. 09/034,639, filed on Mar. 4, 1998, now Pat. No. 6,092,832.

(51) Int. Cl.$^7$ .................................................. B60R 21/16
(52) U.S. Cl. .................................... 280/728.2; 280/731
(58) Field of Search ............................. 280/728.2, 731, 280/732

(56) References Cited

U.S. PATENT DOCUMENTS

| | | | |
|---|---|---|---|
| 5,380,037 | * 1/1995 | Worrell et al. | 280/728.2 |
| 5,501,484 | * 3/1996 | Saderholm et al. | 280/728.2 |
| 5,615,907 | * 4/1997 | Stanger | 280/728.2 |
| 5,692,773 | * 12/1997 | Ono . | |
| 5,775,725 | * 7/1998 | Hodac et al. | 280/728.2 |

* cited by examiner

Primary Examiner—Kenneth R. Rice
(74) Attorney, Agent, or Firm—Kathryn A. Marra

(57) ABSTRACT

A mounting mechanism for an inflatable restraint system includes at least one pair of flat mounting members extending from an inflatable restraint module and adapted to extend through at least one pair of apertures in a support structure. The mounting mechanism also includes a bushing disposed over and cooperating with each of the at least one pair of flat mounting members to form a round pin. The mounting mechanism further includes a spring housing adapted to be disposed adjacent the support structure and a spring disposed in the spring housing to engage the flat mounting members to attach the inflatable restraint module to the support structure.

20 Claims, 3 Drawing Sheets

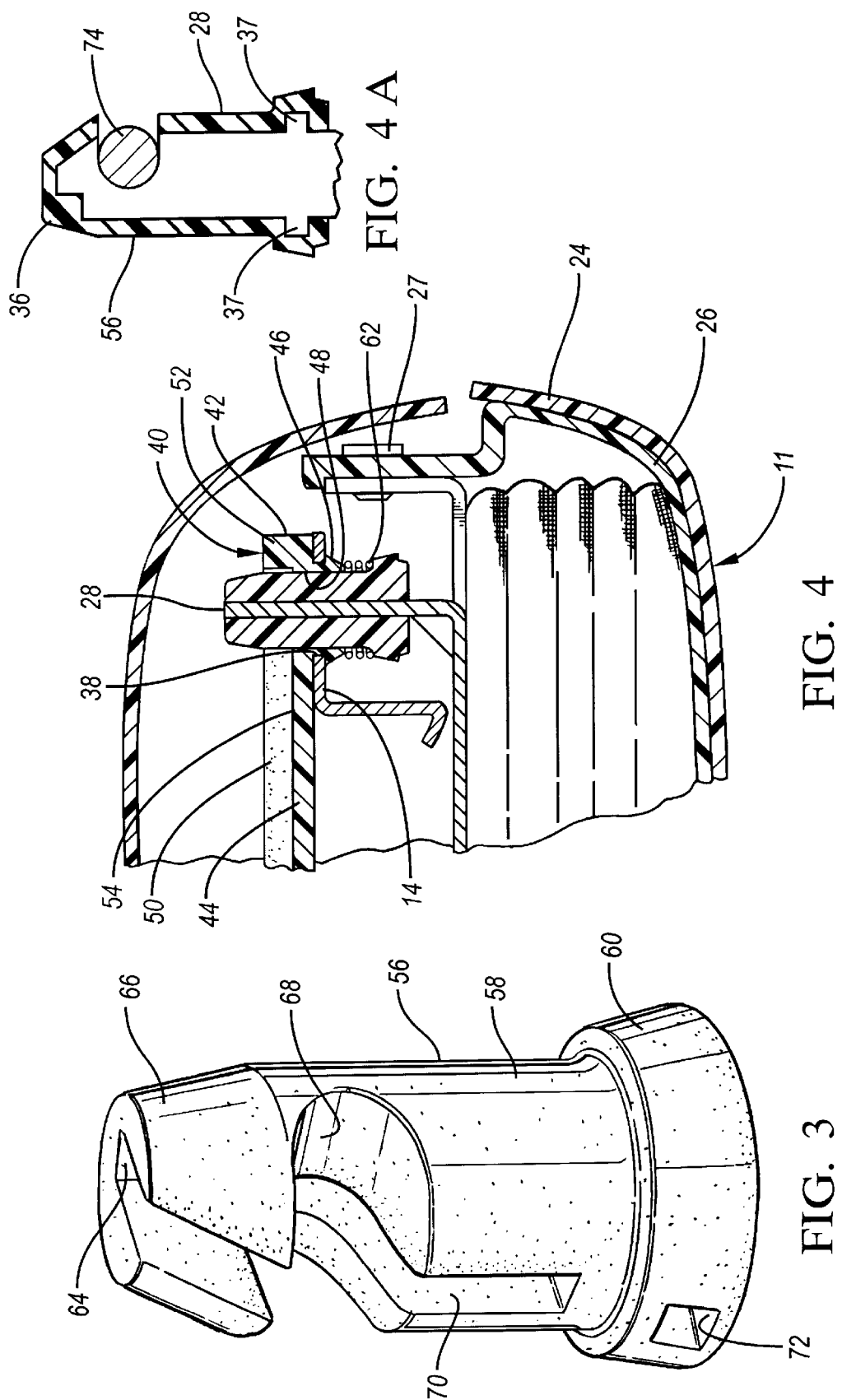

MOUNTING MECHANISM FOR INFLATABLE RESTRAINT SYSTEM

CROSS-REFERENCE TO RELATED APPLICATION(S)

The present application is a Continuation-In-Part application of application Ser. No. 09/034,639, filed Mar. 4, 1998, entitled "AIR BAG MODULE MOUNTING MECHANISM AND METHOD OF MAKING" (H-201496), now U.S. Pat. No. 6,092,832.

TECHNICAL FIELD

The present invention relates generally to inflatable restraint systems for vehicles and, more particularly, to a mounting mechanism for an inflatable restraint system of a vehicle.

BACKGROUND OF THE INVENTION

It is known to provide an inflatable restraint system in a vehicle to augment protection traditionally afforded vehicle occupants through the use of seat belt restraints. In some vehicles, the inflatable restraint system may be an air bag system disposed within an occupant compartment in the vehicle in close proximity to either a driver occupant or one or more passenger occupants. Typically, the air bag system includes an air bag module attached to vehicle structure such as a steering wheel and having an air bag for deployment through an opening in a cover to extend in the occupant compartment of the vehicle. The deployed air bag restrains movement of the occupant to help protect the occupant during a result of a collision.

Various mounting mechanisms have been used for securing the inflatable restraint module to a support structure in a vehicle, such as a steering wheel or dashboard. In one known mounting mechanism, mounting bolts are provided passing from a rear of the support structure and threadably engaging nuts mounted on the inflatable restraint module. In another known mounting mechanism for a vehicle steering wheel, sleeve members mounted to the inflatable restraint module and surrounding the mounting bolts may be forced into contact with a plate forming the supporting structure on a hub portion of the steering wheel to complete a circuit for actuating a horn.

An example of a mounting mechanism for an inflatable restraint module is disclosed in U.S. Pat. No. 5,380,037 to Worrell et al. In this patent, a mounting mechanism is used in mounting an inflatable restraint module to a support structure such as a hub portion of a steering wheel. The steering wheel has a support plate attached to the hub portion and opposing front and rear faces with a plurality of apertures therethrough. The inflatable restraint module has a plurality of mounting members that are adapted to pass through and be retained within the apertures in the support plate. Each of the mounting members is individually cold-formed and broached into a solid, round steel pin having a head portion and an opposing distal. Each of the head portions of the mounting members, typically four, must be separately pressed or welded onto a metal base plate. Each of the mounting members includes a slot for receiving a spring that traverses across the apertures of the support plate.

As a result, it is desirable to provide a mounting mechanism for an inflatable restraint system that does not require mounting members to be individually formed and individually attached to the base plate, which is relatively expensive. It is also desirable to provide a mounting mechanism for an inflatable restraint system with a flat formed pin as the mounting member to reduce mass and cost. It is further desirable to provide a mounting mechanism for an inflatable restraint system with a flat mounting member and a bushing that allows the flat mounting member to be transformed into a round pin.

SUMMARY OF THE INVENTION

It is, therefore, one object of the present invention to provide a mounting mechanism for an inflatable restraint system of a vehicle.

It is another object of the present invention to provide a mounting mechanism for an inflatable restraint system having a flat formed pin as a mounting member.

It is yet another object of the present invention to provide a bushing that interacts with a flat mounting member to transform the flat mounting member into a round pin.

To achieve the foregoing objects, the present invention is a mounting mechanism for an inflatable restraint system including at least one pair of flat mounting members extending from an inflatable restraint module and adapted to extend through at least one pair of apertures in a support structure. The mounting mechanism also includes a bushing disposed over and cooperating with each of the at least one pair of flat mounting members to form a round pin. The mounting mechanism further includes a spring housing adapted to be disposed adjacent the support structure and a spring disposed in the spring housing to engage the flat mounting members to attach the inflatable restraint module to the support structure.

One advantage of the present invention is that an improved mounting mechanism is provided for an inflatable restraint system. Another advantage of the present invention is that the mounting mechanism provides a plurality of flat mounting members that reduce mass and cost for assembly of an inflatable restraint module to a steering wheel. Yet another advantage of the present invention is that the mounting mechanism provides a bushing which is snapped onto the flat mounting member to transform the flat mounting member into a round pin. Still another advantage of the present invention is that the mounting mechanism has a flat mounting member and snap-on bushing which interact with a support plate on the steering wheel in a similar fashion to the steel round pin while still retaining the mass and cost benefits of the flat mounting member. A further advantage of the present invention is that the mounting mechanism has a bushing which helps to reduce insertion force, assists in vibration dampening and reduces cost by eliminating steel round pins. Yet a further advantage of the present invention is that the mounting mechanism has a bushing which occupies the openings in the support plate of the steering wheel, not achievable alone by the flat formed pins. Still a further advantage of the present invention is that the mounting mechanism has a bushing does not interfere with the flat mounting member in retaining the module to the steering wheel.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 3 is a perspective view of a bushing for the mounting mechanism of FIG. 2.

FIG. 4 and 4A is a fragmentary elevational view of the inflatable restraint module mounted to the steering wheel of the inflatable restraint system of FIG. 1 by the mounting mechanism of FIGS. 2 and 3.

DESCRIPTION OF THE PREFERRED EMBODIMENT

Figure 1:
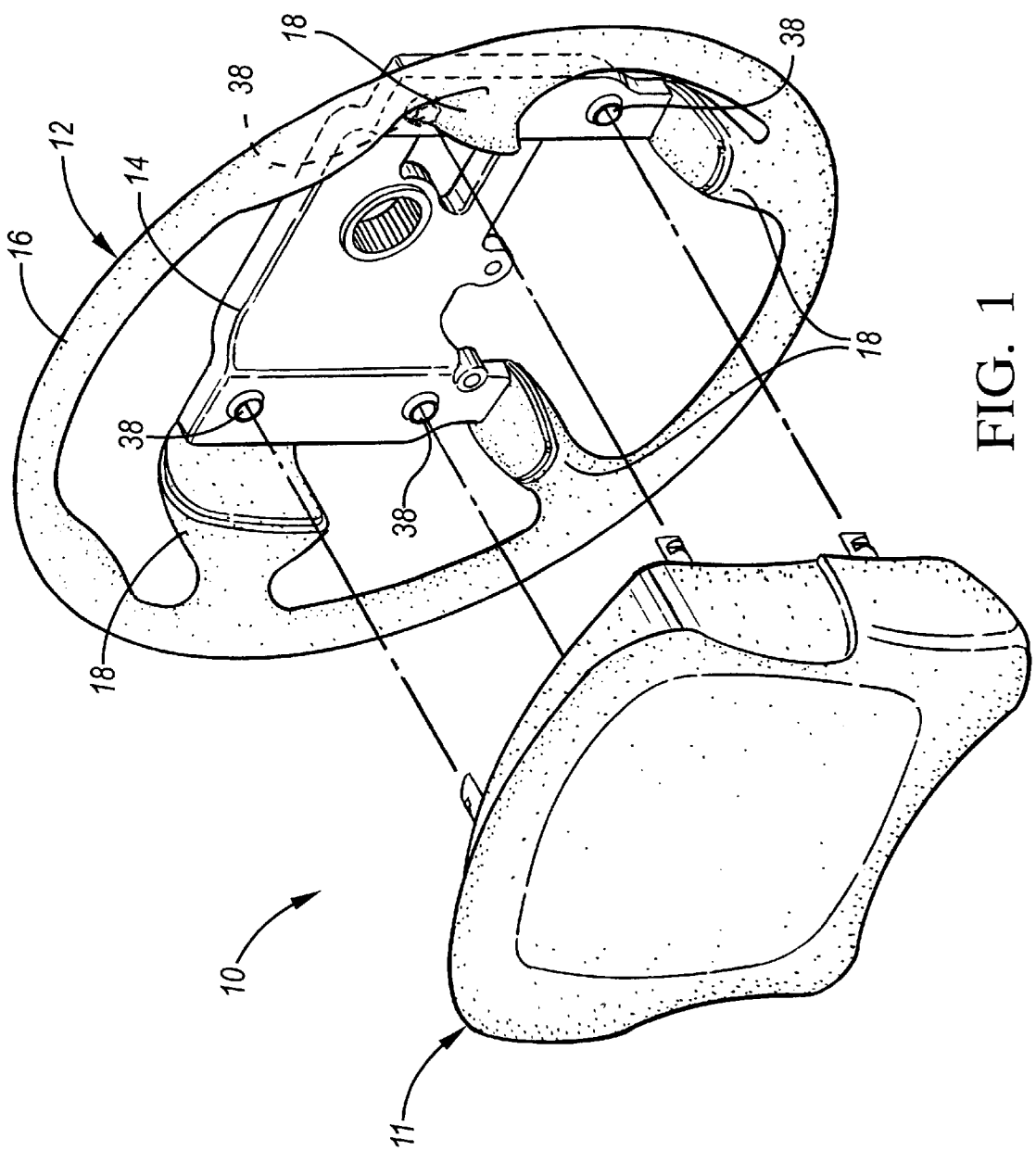
FIG. 1 is an exploded perspective view of an inflatable restraint system, according to the present invention.

Referring to the drawings and in particular FIGS. 1 and 4, one embodiment of an inflatable restraint system 10, according to the present invention, is shown for a vehicle (not shown). The inflatable restraint system 10 includes an inflatable restraint module, generally indicated at 11, and a steering wheel, generally indicated at 12, of the vehicle. The steering wheel 12 includes a central support plate 14, a rim 16 encircling the support plate 14, and at least one, preferably a plurality of spokes 18 interconnecting the rim 16 and support plate 14. It should be appreciated that the support plate 14 is attached to a steering shaft (not shown) of the vehicle in a conventional manner.

The inflatable restraint module 11 includes a base plate 20 for mounting an inflatable restraint such as an air bag and inflator, generally indicated at 22. The inflatable restraint 22 is a conventional air bag for inflating upon receiving gas from the inflator when certain predetermined vehicle conditions are sensed. The air bag is normally folded and the inflatable restraint 22 is encapsulated in a container 24 that is covered by an outer soft cover or pad 26. The container 24 is bolted to the base plate 20 by fasteners 27 to form the assembled inflatable restraint module 11. The cover 26 preferably includes tear lines or weakened portions (not shown) that permit the cover 26 to open during inflation of the air bag of the inflatable restraint 22. The cover 26 may also be used to mount a membrane horn switch (not shown) for activating a horn (not shown).

The inflatable restraint module 11 also includes a plurality of elongated, integrally formed mounting members 28 on the base plate 20 and extend therefrom toward the support plate 14 for easy snap-fitted attachment of the inflatable restraint module 11 to the support plate 14 of the steering wheel 12. In the embodiment illustrated, four such mounting members 28 are integrally formed in a single stamping operation on a single piece or blank of planar material. The blank is preferably a single planar piece of metal, such as steel, having a constant cross-section that can easily be shaped in a single stamping process.

The base plate 20 also includes a stamped central inflator opening 29 through which the inflator may extend to deliver gas directly into the air bag of the inflatable restraint 22. The base plate 20 includes a plurality of suitable apertures 30 for receiving fasteners (not shown) to attach the inflatable restraint 22 to the base plate 20. It should be appreciated that the blank is folded about ninety degrees such that the mounting members 28 extend downwardly from a bottom surface of the base plate 20 to a generally vertical position.

Each of the mounting members 28 has a generally flat and planar main body portion 31 and a widened head portion 32 which is also a flat material, but bent to have a generous, smooth radius of curvature 33 to prevent stresses on the connection between the base plate 20 and mounting members 28. The main body portion 31 includes a tapered distal end 34 and a slot 35 that was integrally formed during the stamping of the blank. The tapered distal end 34 also includes a step 36 formed thereon for a function to be described. The main body portion 31 includes at least one, preferably a pair of locating hooks 37 formed on opposed sides and extending generally perpendicular to a longitudinal axis of the mounting members 28. The slot 35 is also elongated in a direction generally perpendicular to the longitudinal axis of the mounting member 28. The slot 35 is stamped from the blank to include a curved underhook (not shown), which projects slightly into the slot 35 to help assure retention of springs to be described. The support plate 14 is formed with a plurality of apertures 38 corresponding in number and location to the number and location of the mounting members 28, whereby the apertures 38 are disposed to receive the distal ends 34 of the mounting members 28 therethrough.

Figure 2:
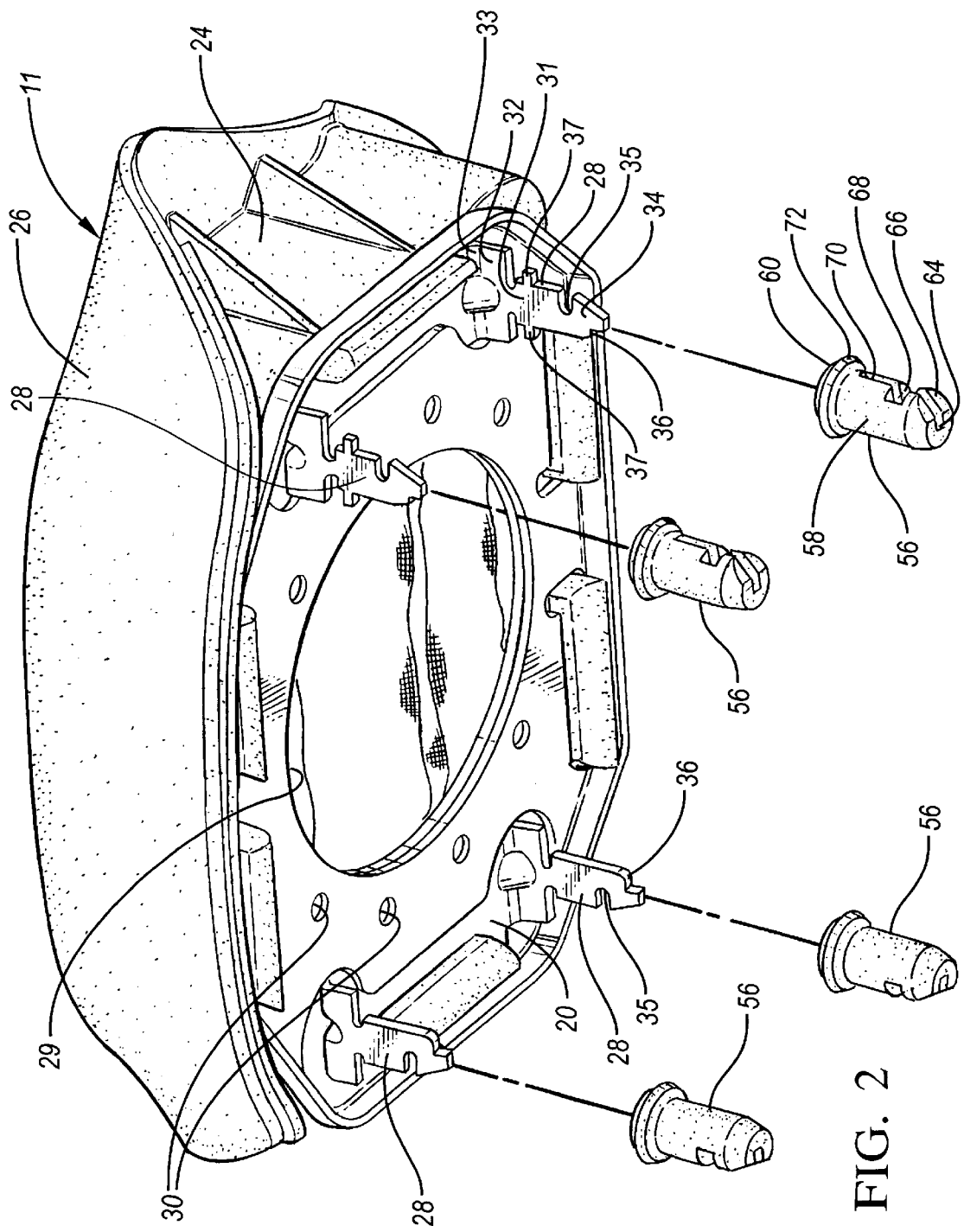
FIG. 2 is an exploded perspective view of a mounting mechanism, according to the present invention, to attach an inflatable restraint module to a steering wheel of the inflatable restraint system of FIG. 1.

Referring to FIGS. 2 through 4, a mounting mechanism, according to the present invention and generally indicated at 40, attaches the inflatable restraint module 11 to the support plate 14 of the steering wheel 12. The mounting mechanism 40 includes at least one, preferably a plurality of spring housings 42 disposed adjacent a rear face of the support plate 14 of the steering wheel 12. Each spring housing 42 has a generally planar base wall 44 extending longitudinally. The base wall 44 is generally rectangular in shape. The base wall 44 has at least one, preferably a plurality of projections 46 extending generally perpendicular thereto to form apertures 48 extending therethrough to receive the mounting members 28 of the inflatable restraint module 11. The projections 46 are generally circular in cross-sectional shape. The projections 46 and apertures 48 correspond in number and location to the number and location of the mounting members 28, whereby the apertures 48 are disposed to receive the distal ends 34 of the mounting members 28.

The spring housing 42 also has a pair of side walls 50 and end walls 52 extending substantially around a periphery of the base wall 44 to form a spring cavity 54. The side walls 50 and end walls 52 are generally perpendicular to the base wall 44 and generally rectangular in shape. The spring housing 42 also has a leg wall (not shown) extending downwardly past the base wall 44 to extend through a corresponding aperture (not shown) in the support plate 14 to hold the spring housing 42 in position on the support plate 14. The spring housing 42 is made of a rigid insulating material such as plastic and is a monolithic structure being integral, unitary and one-piece.

The mounting mechanism 38 also includes a bushing 56, according to the present invention, to transform the flat mounting member 28 into a round or cylindrical pin. The bushing 56 is generally cylindrical in shape and has a main body portion 58 and a flange 60 at a bottom thereof. The flange 60 provides retention for a coiled spring 62 that is used in servicing of the inflatable restraint module 11. The bushing 56 has a locating portion 64 that corresponds to the step 36 on the flat mounting member 28 to locate the bushing 56 relative to the flat mounting member 28. The bushing 56 also has a tapered distal end 66 and a notched out area or notch 68 that provides clearance around the underhook of the flat mounting member 28. The bushing 56 has a slot 70 extending longitudinally therein that fits over the flat mounting member 28. The bushing 56 includes at least one, preferably a pair of attachment windows 72 located on either side of the flange 60 at the bottom of the bushing 56. The attachment windows 72 lock the bushing 56 to the flat mounting member 28 by engaging the locking hooks 37 located on the flat mounting member 28. The bushing 56 is made of a plastic material. The plastic material may contain a lubricant to reduce a coefficient of friction, thus reducing insertion efforts. It should be appreciated that the clearance is necessary to avoid interaction with the module attachment area so only the flat mounting member 28 engages the spring to be described.

The mounting mechanism 40 also includes a spring 74 disposed in the spring cavity 54 of each spring housing 42. The spring 74 extends between and across the pair of apertures 48 of the spring housing 42 in order to ensure that the spring 74 contacts the mounting members 28 as the inflatable restraint module 11 is moved into association with the support plate 14. The spring 74 is preferably formed of a resilient material, such as music wire. The spring 74 is resiliently yieldable in a lateral direction, transverse to the longitudinal axis of the mounting members 28, to permit insertion of the mounting members 28 through the apertures 38 and 48 and past the springs 74, which movement is facilitated by the tapered configuration of the distal ends 34 and 66. It should be appreciated that, except for the mounting members 28 and mounting mechanism 40, the inflatable restraint module 11 and steering wheel 12 are similar to that disclosed in U.S. Pat. No. 5,380,037 to Worrell et al., the disclosure of which is hereby incorporated by reference.

In operation, the mounting members 28 and bushings 56 of the inflatable restraint module 11 are moved in a first direction toward the front face of the support plate 14 and through the apertures 38. The springs 74 move laterally outwardly until they are aligned with the slots 35 and 68, at which time the springs 74 will move laterally inwardly into contact with the slots 35 and 68. In this position, the springs 74 prevent the mounting members 28 from moving in a second direction out of the apertures 38 and 48, whereby the inflatable restraint module 11 is held in operative relationship to the support plate 14. It should be appreciated that the slots 35 have longitudinal heights approximately equal to the dimension of the springs 74 to reduce longitudinal movement of the inflatable restraint module 11 relative to the support plate 14.

If it is desired to separate the inflatable restraint module 11 from the support plate 14, a tool (not shown) such as a screwdriver may be inserted through apertures (not shown) provided in a rear portion of the steering wheel 12, wherein a blade of the screwdriver is received within space provided in the spring housings 42 and the screwdriver is rotated. Rotation of the screwdriver blade located within the spaces causes the blade to contact an end of the spring 74 and a wall opposite the spring 74 to thereby urge the spring 74 laterally outwardly and out of engagement with the slot 35. In this manner, the mounting members 28 are released to move out of engagement with the support plate 14.

Accordingly, the mounting mechanism 40 uses a plastic snap-on bushing 56 to turn the flat mounting member 28 into a round fastener, thereby allowing the strength of steel without the mass or cost. The bushing 56 has a sixty degree lead in angle for improved insertion effort and an annular snap fit over flat mounting members 28. The bushing 56 has clearance around the snap in area of the flat mounting member 28 so only the steel contacts the spring 74 upon full insertion. The bushing 56 provides for retention of the spring 74 and tapered distal end 66 for improved assembly. The bushing 56 has positive locator portion 64 on top of the flat mounting member 28 to assure proper assembly of bushing 56 to the flat mounting member 28.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A mounting mechanism for an inflatable restraint system comprising:

at least one pair of flat mounting members extending from an inflatable restraint module and adapted to extend through at least one pair of apertures in a support structure;

a bushing disposed over and cooperating with each of said at least one pair of flat mounting members to form a round pin;

a spring housing adapted to be disposed adjacent the support structure; and a spring disposed in said spring housing to engage said flat mounting members to attach the inflatable restraint module to the support structure.

2. A mounting mechanism as set forth in claim 1 wherein said bushing has a generally cylindrical main body portion and has a flange at a bottom thereof.

3. A mounting mechanism as set forth in claim 1 wherein said bushing has a tapered distal end and a notch extending generally perpendicular to a longitudinal axis of said bushing.

4. A mounting mechanism as set forth in claim 1 wherein said bushing has a slot extending longitudinally therein to receive one of said at least one pair of flat mounting members.

5. A mounting mechanism as set forth in claim 1 wherein said bushing includes a pair of attachment windows located on opposed sides of said flange.

6. A mounting mechanism as set forth in claim 5 wherein said flat mounting member includes two locking hooks located on opposed sides thereof to cooperate with said attachment windows.

7. A mounting mechanism as set forth in claim 1 wherein said bushing is made of a plastic material.

8. A mounting mechanism as set forth in claim 7 wherein said plastic material contains a lubricant.

9. A mounting mechanism as set forth in claim 1 wherein said flat mounting member has a step thereon to locate said bushing relative to said flat mounting member.

10. A mounting mechanism as set forth in claim 2 wherein each of said at least one pair of flat mounting members has a generally planar main body portion and a widened head portion.

11. A mounting mechanism as set forth in claim 10 wherein said main body portion includes a tapered distal end and a slot elongated in a direction generally perpendicular to a longitudinal axis thereof.

12. An inflatable restraint system for a vehicle comprising:

a steering wheel having a support plate with at least one pair of apertures extending therethrough;

an inflatable restraint module having at least one pair of flat mounting members extending through said at least one pair of apertures; and a mounting mechanism comprising a bushing disposed over and cooperating with each of said at least one pair of flat mounting members to form a round pin, a spring housing disposed adjacent said support plate, and a spring disposed in said spring housing to engage said flat mounting members to attach said inflatable restraint module to said support plate of said steering wheel.

13. An inflatable restraint system as set forth in claim 12 wherein each of said at least one pair of flat mounting members has a generally planar main body portion and a widened head portion.

14. An inflatable restraint system as set forth in claim 13 wherein said main body portion includes a tapered distal end and a slot elongated in a direction generally perpendicular to a longitudinal axis of said main body portion.

15. An inflatable restraint system as set forth in claim 14 wherein said bushing is generally cylindrical in shape and has a flange at a bottom thereof.

16. An inflatable restraint system as set forth in claim 12 wherein said bushing has a tapered distal end and a notch extending generally perpendicular to a longitudinal axis thereof.

17. An inflatable restraint system as set forth in claim 16 wherein said bushing has a slot extending longitudinally therein to receive on of said at least one pair of flat mounting members.

18. An inflatable restraint system as set forth in claim 16 wherein said flat mounting member includes two locking hooks located on opposed sides thereof.

19. An inflatable restraint system as set forth in claim 18 wherein said bushing includes a pair of attachment windows located on opposed sides of said flange to cooperate with said locking hooks.

20. An inflatable restraint system for a vehicle comprising:
   a steering wheel having a support plate with a plurality of apertures extending therethrough;
   an inflatable restraint module having a plurality of flat mounting members extending through said apertures, wherein each of said flat mounting members has a generally planar main body portion and a widened head portion, wherein said main body portion includes a tapered distal end and a slot elongated in a direction generally perpendicular to a longitudinal axis of said flat mounting members; and
   a mounting mechanism comprising a bushing having a slot extending longitudinally therein to receive one of said flat mounting members to transform said flat mounting members into a round pin, a spring housing disposed adjacent said support structure, and a spring disposed in said spring housing to engage said flat mounting members to attach said inflatable restraint module to said support plate of said steering wheel.

* * * * *

UNITED STATES PATENT AND TRADEMARK OFFICE
Certificate

Patent No. 6,196,573 B1

Patented: March 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Barry Christian Worrell, Centerville, OH; Patrick W. Schatz, Lebanon, OH; Ryan Todd Pinsenschaum, Vandalia, OH; and Charles D. Griever, Jr., Springfield, OH.

Signed and Sealed this Twenty-third Day of September 2003.

ROBERT OLSZEWSKI
*Acting Supervisory Patent Examiner*
Art Unit 3627